J. THWAITES.
HOT AIR BED RADIATOR.
APPLICATION FILED OCT. 4, 1913.

1,129,141.

Patented Feb. 23, 1915.

Witnesses.
E. W. Bayly.
W. P. Bayly.

Inventor:
Jane Thwaites,
per John Pitt Bayly.
Attorney.

UNITED STATES PATENT OFFICE.

JANE THWAITES, OF CLACTON-ON-SEA, ENGLAND.

HOT-AIR BED-RADIATOR.

1,129,141.          Specification of Letters Patent.      Patented Feb. 23, 1915.

Application filed October 4, 1913. Serial No. 793,463.

*To all whom it may concern:*

Be it known that I, JANE THWAITES, a subject of the King of Great Britain, residing at Rushmere, St. Vincent Road, Clacton-on-Sea, in the county of Essex, in England, have invented a new and useful Improvement in Hot-Air Bed-Radiators, of which the following is a specification.

The article of manufacture forming the subject of this invention is a device for warming beds and for like purposes and comprises a suitably shaped casing of metal made in two parts, one adapted to fit over the other and to inclose a heater of metal or other heat conducting material.

The invention is illustrated by way of example in the accompanying drawings in which—

Figure 1:
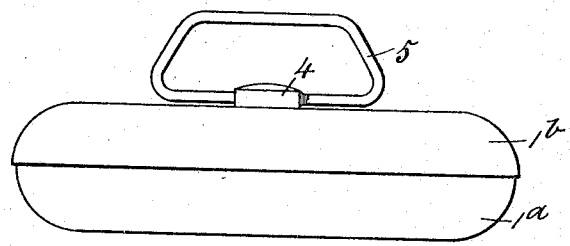
Figure 2:
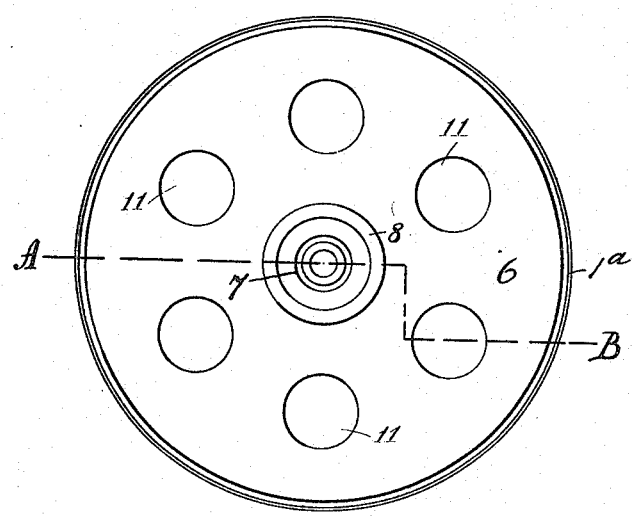
Figure 3:
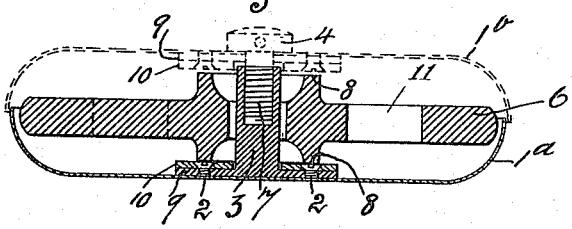

Figure 1, is a view of an improved bed warmer of spheroidal form in closed position, Fig. 2, is a plan with the upper part of the casing removed and Fig. 3, is a section on the line A—B Fig. 2, the dotted lines indicate the upper part of the apparatus.

Referring to the drawing Fig. 1, denotes the casing of the bed warmer which casing consists of a base $1^a$ and a cover $1^b$ of slightly larger diameter adapted to fit thereover. Within the base $1^b$ is secured as by means of screws 2 a tubular member 3 threaded internally for the reception of a screw 4 preferably secured to the cover $1^b$. A handle 5 is preferably attached to said screw 4. The tubular member 3 serves to position a heater member 6 with perforations 11 of suitable heat conducting material formed with a central orifice 7 for the passage of said tubular member, the heater member being shaped to conform to the interior of the casing and provided with annular ribs 8. Around the tubular member 3 and around the screw 4 within the casing are preferably located metal washers 9, and washers 10 of asbestos or other non-conducting material on which bear the annular ribs 8 of the heater member so that the heater member may be maintained out of contact with the casing. The heater member may be perforated as shown so as to reduce the weight and to allow of its being heated through more quickly, besides affording increased surface for radiation of heat.

The *modus operandi* is as follows:—The heater member 6 is placed on a gas stove or gas ring or on the fire until heated through and is then lifted out by means of tongs or the like and passed over the tubular member 3 within the base $1^a$ of the casing and the cover $1^b$ of the casing screwed down by means of the screw 4 and the handle 5 until the heater member 6 bears hard on the said washers. The device is then ready for use. The casing may be placed in a flannel bag or the like.

I claim:

1. An apparatus for warming beds and like purposes comprising in combination a base $1^a$, a cover $1^b$ adapted to fit over said base, a tubular member 3 secured within said base, a heating member 6 comprising a perforated disk and adapted to be positioned within a casing, formed by said base $1^a$ and said cover $1^b$ by means of said tubular member 3 said heating member being provided with a central orifice for the reception of said tubular member, said heating member being shaped to conform to the shape of the casing and provided with annular ribs as set forth.

2. An apparatus for warming beds and like purpose comprising in combination, a base $1^a$, a cover $1^b$ adapted to fit over said base, a tubular member 3 secured within said base, a heating member 6 comprising a perforated disk and adapted to be positioned within a casing formed by said base $1^a$ and said cover $1^b$ by means of said tubular member 3, said heating member being provided with a central orifice for the reception of said tubular member, means for maintaining said tubular member in operative relation within said casing, washers 9 and 10 around said tubular member, said heating member being shaped to conform to the shape of the casing, and annular ribs on said heating member, as set forth.

JANE THWAITES.

Witnesses:
M. KLAIR WARD,
L. B. EDWARDS.

Copies of this patent may be obtained for five cents each, by addressing the "Commissioner of Patents, Washington, D. C."